W. C. WELLS.
Drill Gage.
No. 51,248. Patented Nov. 28, 1865.
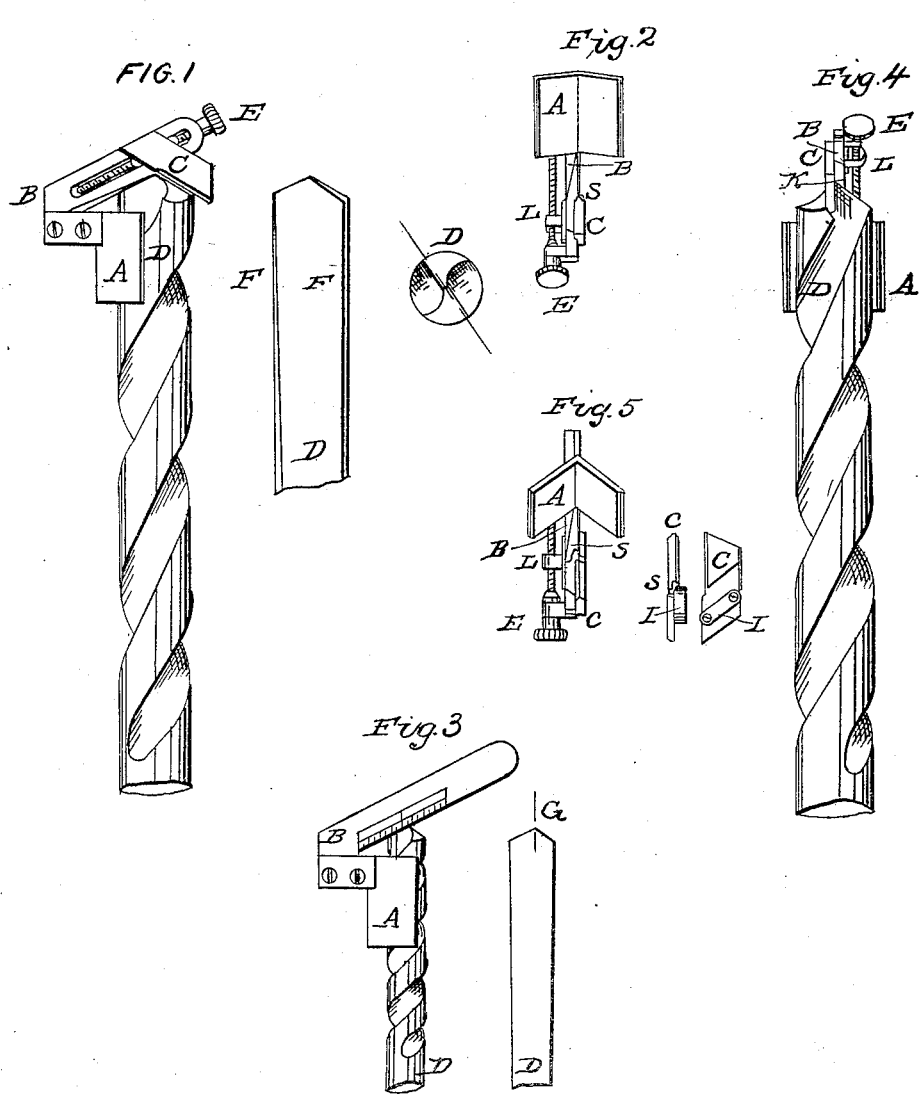

UNITED STATES PATENT OFFICE.

WILLIAM C. WELLS, OF NEWARK, NEW JERSEY.

IMPROVED DRILL-GAGE.

Specification forming part of Letters Patent No. 51,248, dated November 28, 1865.

*To all whom it may concern:*

Be it known that I, WILLIAM C. WELLS, of Newark, in the county of Essex, in the State of New Jersey, have invented a new and useful Universal Drill-Gage, for Gaging the Points of Twist or Flat Drills of Different Sizes; and I do hereby declare that the following is a full, clear, and exact description of the construction and operation of the same, reference being had to the annexed drawings, and to the letters of reference marked thereon.

The nature of my invention consists in constructing a gage in such a manner that by it I am enabled to shape the point and cutting-lips of a twist or flat drill, so that the point of the drill shall be perfectly central and the cutting-lips be of a proper and corresponding angle in relation to each other.

Figure 1 is a side view of the gage with the drill held in its proper position. Fig. 2 is an inverted or under-side view of the gage and an end view of the drill. Fig. 3 is a side view of the gage with a scale of the fractional parts of an inch substituted in place of a traverse-blade and regulating-screw. Fig. 4 is an end view of the gage with the drill held in position, showing the back bevel or clearance for the cutting-lip of the drill. Fig. 5 is an inverted view of the gage and a side and edge view of the traverse-blade C.

Fig. 1: A is a V-shaped guide, which guides the drill concentrically beneath the stationary angular blade B.

B is a stationary angular blade erected vertically in one direction and obliquely in another direction above the V-shaped guide.

C is a traverse-blade attached to the stationary blade, and set on an opposite but corresponding angle with the stationary blade, and secured in its angular position by means of a tongue, I, Fig. 5, which is fitted into and passes through a slot in the stationary blade B, as shown in Fig. 1, and is fastened on the back by a gib, L, Fig. 5, which is secured fast to the tongue. Thus, while the traverse-blade must maintain its proper angular position, it is perfectly free to move up or down on the stationary blade B, and by this means contracting or extending the angle which the two blades describe by operating the regulating-screw E, which passes through a lug on the gib L, as shown at Fig. 2, and is secured in a bearing on the stationary blade.

The traverse-blade C is provided with a shoulder, as shown at Fig. 5, letter S, which underlaps the lower edge of the stationary blade, as shown at Fig. 2, letter S, so as to conform to the cutting-lips of the drill, which stand forward of the center line, as shown at Fig. 2, letter D.

The stationary blade B is beveled on its lower edge, as shown at Fig. 4, letter K, so as to conform to the back bevel or clearance for the lips of the drill to insure their cutting freely.

In order to shape the point of the drill, hold the gage in the right hand with the traverse-blade C towards you; place a drill in the V-shaped guide with your right thumb bearing on the drill; press the lip of the drill against the under edge of the stationary blade, so that the front edge of the lip will be even with the front edge of the stationary blade; then file or grind off the lip until it conforms with the angle of the stationary blade B; then screw down the traverse-blade until it bears on the opposite lip; grind off this second lip until the two blades bear along the entire length of the two lips. The intersection of the two blades will describe the point of the drill, the angles of the blades will describe the proper angles and height of the lips, and the bevel on the under edge of the stationary blade will give the proper clearance or cutting-edge to the lips of the drill. When a flat drill is used its edges should be rounded or turned in a lathe.

It might be supposed that the traverse-blade C performed no function, and might be dispensed with, as in Fig. 3, and the stationary blade B used alone; but a drill sharpened by this means might conform to the angle of the blade, yet by chance one lip might be higher than the other, which would throw the point to one side of the center of the drill, as shown at Fig. 3, letter G. To prevent this a scale containing the fractional parts of an inch could be attached, as shown at Fig. 3, so as to conform to the diameter of a drill; but this would be impracticable, since all drills do not vary by the same fractions. An adjustable gage, therefore, is the only thing which meets the requirements; and the traverse-blade C, as here applied, it will be seen, performs a very important function, for by its use in the combination herein described I am enabled to construct an adjustable or universal gage, or a gage adapted to drills of all sizes.

I do not claim guiding a drill concentrically beneath a stationary blade by means of a V-shaped guide. Neither do I claim merely attaching a stationary blade to a V-shaped guide. That has been done before; but

What I claim is—

1. The construction of an adjustable gage in such a manner as to bear on the sides, point, and both the cutting-lips of a drill simultaneously.

2. The manner of placing a stationary blade, B, above a V-shaped guide, A, so that said blade shall stand vertically and obliquely, and shall describe two given angles, for the purpose as is herein specified.

3. The traverse-blade C, which is provided with a tongue, I, and which is attached to the stationary blade in such manner and for such purpose as is herein set forth.

4. Providing the traverse C with a shoulder, D, so as to underlap the lower edge of the stationary blade B, for the purpose as is herein specified.

WILLIAM C. WELLS.

Witnesses:
W. BRADSHAW,
ISAAC POINIER.